US007844379B2

(12) United States Patent
Tang et al.

(10) Patent No.: US 7,844,379 B2
(45) Date of Patent: Nov. 30, 2010

(54) INTELLIGENT BOOM CONTROL DEVICE

(75) Inventors: Xiujun Tang, Changsha (CN); Peike Shi, Changsha (CN); Shenghua Li, Changsha (CN); Songyun Zhou, Changsha (CN)

(73) Assignee: SANY Heavy Industry Co., Ltd., Hunan Province (CN)

( * ) Notice: Subject to any disclaimer, the term of this patent is extended or adjusted under 35 U.S.C. 154(b) by 840 days.

(21) Appl. No.: 11/749,751

(22) Filed: May 17, 2007

(65) Prior Publication Data

US 2008/0162005 A1 Jul. 3, 2008

(30) Foreign Application Priority Data

Dec. 31, 2006 (CN) ........................ 2006 1 0156416

(51) Int. Cl.
*G06F 19/00* (2006.01)

(52) U.S. Cl. ........................................................ 701/50

(58) Field of Classification Search ................... 701/50; 37/394-395, 348, 414; 299/1.05
See application file for complete search history.

(56) References Cited

U.S. PATENT DOCUMENTS

| | | | | |
|---|---|---|---|---|
| 4,589,810 | A | 5/1986 | Heindl et al. | |
| 5,640,996 | A | 6/1997 | Schlecht et al. | |
| 5,823,218 | A * | 10/1998 | Schlecht et al. | 137/2 |
| 6,782,644 | B2 * | 8/2004 | Fujishima et al. | 37/348 |
| 6,862,509 | B2 | 3/2005 | Rau et al. | |
| 6,883,532 | B2 | 4/2005 | Rau | |
| 2004/0052627 | A1 | 3/2004 | Rau et al. | |
| 2004/0094212 | A1 | 5/2004 | Benckert et al. | |

FOREIGN PATENT DOCUMENTS

| | | | |
|---|---|---|---|
| CN | 1524150 | | 8/2004 |
| CN | 1678806 | | 10/2005 |
| DE | 4306127 | A1 | 9/1994 |

(Continued)

OTHER PUBLICATIONS

Benckert, "Computer Controlled Concrete Distribution" vol. 8, Jan. 1, 1991, pp. 111-119, XP000490266, 12238 Automation and Robotics in Construction, International Symposium, Jun. 3-5, 1991, Stuttgart, DE.

(Continued)

*Primary Examiner*—Yonel Beaulieu
(74) *Attorney, Agent, or Firm*—Townsend and Townsend and Crew LLP

(57) ABSTRACT

An intelligent boom control device includes: a control unit and an angle measurement unit, the control unit calculating the boom position information based on measured value of angles, whereby adjusting the control of various actuators; the device further including: a remote controller which transmits control commands and can provide movement control commands including X axis component, Y axis component and Z axis component used in a rectangular coordinate system; a rectangular coordinate system being defined in a space; when the remote controller transmits a movement control command, the control unit determining the movement direction of the boom end in a plane according to the X axis component and Y axis component of the received movement control command, and decomposing the movement into movement of each boom section and the rotary platform so that the boom end moves to the direction indicated by the movement control command.

23 Claims, 6 Drawing Sheets

FOREIGN PATENT DOCUMENTS

| | | | |
|---|---|---|---|
| DE | 10328769 | A1 | 1/2005 |
| RU | 2113396 | C1 | 6/1998 |
| RU | 2129953 | C1 | 5/1999 |

OTHER PUBLICATIONS

Benckert et al., "Entwicklung Der Antriebshydraulik Fuer Mobile Betonverteilermaste" vol. 36, No. 4, Apr. 1, 1992, pp. 242-244, 247, XP000263824, ISSN: 0341-2660, O+P Olhydraulik und Pneumatik, Vereinigte Fachverlage, Mainz, DE.

Kuntze et al., "On the Dynamic Control of a Hydraulic Large Range Robot for Construction Applications" vol. 4, No. 1, Mar. 1, 1995, pp. 61-73, XP004047515, ISSN: 0926-5805, Automation in Construction, Elsevier Science Publishers, Amsterdam, NL.

The extended European Search Report corresponding to the Application No. 07107899.2-1256, date of mailing Jun. 23, 2009, 11 pages total.

Decision on Grant of Patent for Invention of RU Application No. RU Patent Application No. 2007118450/11 (020093); 5 pages total.

* cited by examiner

INTELLIGENT BOOM CONTROL DEVICE

CROSS-REFERENCES TO RELATED APPLICATIONS

This application claims priority to Chinese Patent Application No. 200610156416.8, filed Dec. 31, 2006, commonly assigned, incorporated by reference herein for all purposes.

BACKGROUND OF THE INVENTION

The present invention relates to a boom control device. In particular, the invention relates to an intelligent boom control device.

Various construction vehicles with boom are widely used. The boom is a device including at least three boom sections hinged by horizontal joint shafts. Each boom section can rotate a considerable angle around the joint shafts. Meanwhile, the whole boom is fixed to a machine frame by rotary platform, which can bring the whole boom to rotate around the upright axis vertical to the horizontal plane for 360 degree. A typical application of this boom is to act as construction apparatus, for example to move objects from one spot to another and hang up them. At present, such boom devices are widely applied to construction site for concrete placing and other like works.

For example, concrete pump truck with feed spreading boom is a typical construction vehicle with boom. Such vehicle is applied to concrete placing according to the operating control requirements at construction sites that need concrete placing. When boom device is applied for concrete placing and the like, control requirement for the boom device is relatively strict, especially there is a need to accurately control movement track of boom end.

FIG. 1 shows a boom structure of such concrete pump truck. The structure and control principle of this boom will be described with reference to FIG. 1 hereinafter.

As shown in FIG. 1, a concreter pump truck 8 includes a boom 9, and a machine frame 10 formed of automobile chassis.

In FIG. 1, the boom 9 is composed of five boom sections 12-16 hinged with each other, and rotary platform 11 driven by hydraulic motor and being rotatable around upright axis 18. The five boom sections are called first arm 12, second arm 13, third arm 14, fourth arm 15 and fifth arm 16, each boom section is controlled by a corresponding one of hydraulic oil cylinders 31-35, respectively. The action of which can revolve the respectively controlled boom section around their respective joint shafts. Meanwhile, the rotary platform 11 may also be driven to rotate by hydraulic rotary motor 30 (not shown in FIG. 1, please refer to FIG. 2). During construction, by means of the movement of operating handle of a remote controller, operator can control the gesture of the boom and the rotation of the rotary platform so as to move the boom end 20 having a terminal hose 17 above the area to be placed with concrete. This terminal hose 17 is connected to a concrete conveying pump, and the concrete is ejected through terminal hose 17 to implement concrete placing.

FIG. 2 shows the movement control system of the boom shown in FIG. 1 in the prior art. This system includes a remote controller 40 which can transmit wireless remote control signal, a receiver 41 fixed to the vehicle, an electrical hydraulic control element, i.e., electric proportional multi-way valve 52, the hydraulic oil motor 30, and an executive unit 53 composed of the hydraulic oil cylinders 31-35.

As shown in FIG. 2, the remote controller 40 includes six proportional rockers 42-47 which may be adjusted to and fro along a primary adjustment direction and may transmit remote control signals in analog quantity for controlling the rotary platform and the respective boom sections, respectively. The remote control signals are transmitted to the receiver 41 fixed to the vehicle by radio wave 51 at a certain frequency. The remote controller 40 also includes a row of other switch mechanisms 48, 49, 49', 49", and when they are operated other related remote control radio signals are transmitted by radio wave 51 at a certain frequency to radio receiver 41. When adjusting the working position of the boom end, if an action of a certain boom section or a rotary action is needed, the control command can be transmitted by manipulating the corresponding proportional rockers 42-47 forward or backward. After receiving the radio signals, the receiver 41 outputs PWM driving signals corresponding to each boom section or the rotary platform to electric proportional multi-way valve 52 so as to perform control. The electric proportional multi-way valve 52 includes electric proportional valves 56-60 for driving hydraulic oil cylinders 31-35, respectively; and further includes an electric proportional valve 55 for driving a two-way oil motor 30. Elongating or shortening the hydraulic oil cylinders 31-35 makes the corresponding boom sections pivot about the joint shafts restrictedly. A rotation of the oil motor 30 can make the whole boom 9 rotate around the upright axis 18 by a deceleration mechanism.

The above-described is a typical manner for implementing the action of a single section boom. This embodiment does not require a boom measuring and sensing system as well as a coordinate transformation system supported by computer, however, it cause complicated operation. For example, if assuming in FIG. 1 that terminal hose 17 needs to be moved from the position shown in the figure to position A without changing the height of the boom end 20, the operator has to move at least two or more boom sections. Therefore, operator needs to control two of the rockers 43-47 to move the hose 17 from the position shown in the figure to point A without changing the height. However, to accomplish this operation quickly, even an experienced operator can hardly keep the height of the boom end 20 during the process of movement.

In the prior art, a number of technical solutions to implement automatic control of the boom movement using automatic control technology have been proposed to solve the above-described problem of moving multi-sections boom without changing its operation height. These technique solutions implement a simply and easy control of the boom by means of a boom measuring and sensing system as well as a coordinate transformation system supported by computer.

For example, German Patent No. DE-A-4306127 (see also U.S. Pat. No. 6,862,509) owned by Putzmeister Company regarding boom operating device provides a boom operating device on which a cylinder (polar) coordinate system is defined, the cylinder coordinate system has three coordinate axes: ψ, r and h (refer to FIG. 1). The three coordinate axes correspond to boom rotation (ψ), boom elongating or shortening (r) and boom height lifting and lowering (h).

In the patent owned by Putzmeister Company, a rocker having three primary adjustment directions is used to implement the control according to three directions of the cylinder coordinate mode defined above. Each primary adjustment direction of the rocker corresponds to one coordinate axis. When an operator controls the rocker to move, a signal corresponding to the related coordinate axis is generated according to the moving direction of the rocker, and through a computation of a computer, control components corresponding to the relative rotation of respective boom sections and the rotation of the whole boom are generated so that the boom can be controlled to move in the defined coordinate system according to the action of the rocker. The control components at the three coordinate axes can also be combined so that an operating/control action can transmit control signals regarding more than two coordinate axes direction to implement control of the boom end in a simple but accurate way, especially control of the coordinate axes parallel to the horizontal plane.

In the intelligent boom control device provided in the above-described patent, the coordinate system defined therein is of great intuitionistic so that it is very convenient for an operator to move the boom end from one position to another in the space.

However, the intelligent boom control device described above still has obvious drawback.

As for a typical boom application such as concrete pump truck, when placing concrete, how to move the boom end from one space position to another space position is only one of the concerned problems, moreover it is needed to accurately control the movement track of the boom end, so that the correct placing execution be implemented.

During the placing execution, placing along the direction of straight lines perpendicular to each other is the typical placing method. In this placing method the movement track of the boom end is required to be straight line.

In the cylinder coordinate mode provided in the prior art, the movement track of the boom end is usually an arc line rather than a straight line because of the adaptation of the rotation axis. Please refer to FIG. 3, this figure shows a formation process of the movement track accomplishing the movement from point A in a plane to point D in the same plane in the cylinder coordinate mode described above. In this example, it assumes that movement in the direction of height axis h is not required, i.e. the movement from point A to point D is at the same height.

FIG. 3*a* shows projection of initial position of the boom to the horizontal plane. At this time, the boom end N is at point A in the cylinder coordinate plane with rotary platform as origin O. The present operating requirement is shown in FIG. 3*b*, i.e. moving the boom end N from current coordinate point A to point D, the required track is a length of straight line from point A to point D shown in FIG. 3*b*. However, in the cylinder coordinate mode, actual track of the boom end N is not a straight line.

Please refer to FIG. 3*c*, this figure shows a track of the boom end in the cylinder coordinate mode. In the present cylinder coordinate mode, the movement track of the boom end is decomposed to the $\psi$ axis movement and r axis movement. Decomposing the movement in this manner, the boom end N will rotate about the $\psi$ axis in the axis direction, and move on the r axis, i.e., the straight line in the elongating direction MN of the boom at the same time. In the original state, the end N of the boom MN coincides with point A, i.e. the projection of the boom MN to the horizontal plane is OA; the projection of the boom to plane is OB at next time unit because the boom rotates and elongates at the same time during its movement. Similarly, the projection of the boom to plane is OC at further next time unit, and the projection of the boom to plane is OD when moving to the terminal target position D. In this way, the track of the projection of the boom end N on the plane is a length of polygonal line from point A to point D. This line is a track formed from only few points at time units. In fact, the track of the boom end N from point A to point D is a length of arc with increasing radius. Such movement track doesn't have negative effect on general construction operating. However, in the case of cement placing and the like where control requirement for movement track of the boom end N is relatively high, the above movement track can't satisfy the operating requirement.

BRIEF SUMMARY OF THE INVENTION

The present invention provides an intelligent boom control device which can move a boom end from one position to another along a straight line track and therefore satisfy the requirement of the construction where the movement track of the boom end must be a straight line.

The present invention provides an intelligent boom control device, the boom being hinged to a rotary platform rotatable around an upright axis fixed to a machine frame, and the boom having at least three boom sections hinged with each other by horizontal joint shafts, each boom section can pivot restrictedly about the joint shafts parallel to each other with respect to the rotary platform or other boom sections under the action of actuators; said intelligent boom control device comprising:

a control unit for controlling the respective actuators according to control commands so that the boom end moves in the defined coordinate system in accordance with the control commands;

an angle measurement unit including angle sensors for measuring the angles between the boom sections as well as the rotating angle of the rotary platform, this unit being used to provide measured value of angle to the control unit which calculates the boom position information based on the measured value of angles, whereby adjusting the control of respective actuators;

a remote controller for transmitting the control commands in the form of wireless remote control;

wherein the remote controller can provide movement control commands used in a rectangular coordinate system, the movement command including a X axis component, a Y axis component and a Z axis component;

a rectangular coordinate system is defined in a space, X axis, Y axis and Z axis of this rectangular coordinate system correspond to the X axis component, the Y axis component and the Z axis component of the movement control commands of the remote controller, respectively; wherein a plane defined by the plane rectangular coordinate system consisted of X axis and Y axis is parallel to the horizontal plane; the Z axis always regards the up direction vertical to the horizontal plane as the positive direction;

when the remote controller transmits a movement control command, the control unit determines the movement direction of the boom end in the plane rectangular coordinate system based on the X axis component and Y axis component of the received movement control command, and decomposes the movement into movement of each boom section and the rotary platform so that the boom end moves in the direction indicated by the movement control command in the rectangular coordinate system.

Preferably, the remote controller adopts a proportional rocker having two primary adjustment directions to provide the movement control command, wherein one primary adjustment direction corresponds to X axis, the other primary adjustment direction corresponds to Y axis; when the proportional rocker inclines in a direction other than the primary adjustment directions, the movement control command is generated on the basis of the X axis component obtained by projecting the movement of the proportional rocker on the primary adjustment direction of X axis and the Y axis component obtained by projecting the movement of the proportional rocker on the corresponding primary adjustment direction of Y axis.

Preferably, when a command of establishing a rectangular coordinate system transmitted, the rectangular coordinate system defined by the X axis and the Y axis is determined using the rotary platform as the coordinate origin and the elongating direction of the boom as positive direction of the Y axis of the rectangular coordinate system.

Preferably, the command of establishing rectangular coordinate system is transmitted when the proportional rocker of the remote controller returns to a center position.

Preferably, the rectangular coordinate system is established in the following manner: recording the initial point position of the boom end in the horizontal plane, then recording the end point position in the horizontal plane to which the boom end finally reaches after moving the boom end, the direction of the connecting line from the initial point to the end point is served as the positive direction of the X axis, whereby establishing the rectangular coordinate system. After establishing the coordinate system, a movement of the proportional rocker of the remote controller in the primary adjustment direction corresponding to the X axis corresponds to a boom end movement parallel to the X axis of the plane rectangular coordinate system, a movement of the proportional rocker of the remote controller in the primary adjustment direction corresponding to the Y axis corresponds to a boom end movement parallel to the Y axis of the plane rectangular coordinate system.

Preferably, the remote controller has a special teaching selecting switch, when a teaching manner is selected by the teaching selecting switch, it is started to record the position of the horizontal plane in which the boom end is located so as to determine the rectangular coordinate system.

Preferably, a receiver is fixed to the vehicle on which the boom is mounted, the receiver being used to receive the remote control command transmitted from the remote controller, and convert the received remote control command into an output of control data flow.

Preferably, the actuator is hydraulic oil cylinder and oil motor controlled by electric proportional valve.

Preferably, the control unit including:

a command parameter decomposing unit for receiving the control data flow outputted from the receiver and decomposing the control data flow into command code corresponding to the control command transmitted from the control mechanism on the remote controller;

an actual position calculating unit for receiving the data of measured value of angle output from the angle measuring unit, calculating to obtain the boom position information based on said data;

a movement planning unit for receiving the command code outputted from the command parameter decomposing unit and the boom position information outputted from the actual position calculating unit so as to calculate a movement amount of each boom section and the rotary platform required to move the boom end to a target position and keep it in a given straight line or plane, said movement amount being served as movement planning;

a flow control unit for receiving the movement planning outputted from the movement planning unit and outputting a command voltage or command current controlling each boom section and the rotary platform based on the outputted movement planning;

a power driving unit for receiving the command voltage or command current corresponding to each boom section and the rotary platform which is outputted from the flow control unit, and generating a driving voltage with a corresponding value based on the command voltage or command current so as to control the opening amount and direction of the electric proportional valve, and further control the elongating or shortening of the hydraulic oil cylinder as well as the rotation of the hydraulic motor to the position determined by the movement planning.

Preferably, the boom position information calculated by the actual position calculating unit includes the position coordinate of each boom section end and the boom end.

Preferably, when the movement planning unit plans movement, the target position is firstly obtained in the following manner: calculating to obtain the movement direction of the boom end based on the X axis component and the Y axis component of the movement control command in the received command code; based on the movement direction and combined with a preset steplength parameter, the target position of the boom end is obtained by adding the steplength in said movement direction to the current position of the boom end.

Preferably, the flow control unit adjusts the output of the command voltage or command current corresponding to each boom section and the rotary platform based on real-time boom position information on occasion to ensure the boom end moves in a horizontal plane.

Preferably, the inclining angle of the proportional rocker on the remote controller corresponds to the moving speed; the flow control unit adjusts the output of the command voltage or command current based on the moving speed.

Preferably, the flow control unit calculates the difference between the boom end moving speed and the command moving speed based on real-time boom position information, whereby adjusts the output of the command voltage or command current corresponding to each boom section and the rotary platform to implement a synchronous control of the boom movement.

Preferably, after receiving the movement planning, the flow control unit firstly judges the reasonableness of the movement planning. If the movement planning is reasonable, then generate the command voltage or command current; if the movement planning is unreasonable, then require the movement planning unit to replan the movement.

Preferably, the flow control unit judging the reasonableness of the movement planning includes judging the movement continuity of each boom section and the rotary platform with respect to the current position; if the movement is continuous, the movement planning is reasonable; if the movement is incontinuous, the movement planning is unreasonable.

Preferably, the remote controller includes a control mode switch for choosing a control mode which can be rectangular coordinate control mode, cylinder coordinate control mode or manual control mode.

Preferably, the remote controller is further provided with a proportional rocker for controlling the lifting and lowering of the boom end, so as to control the lifting and lowering movement of the boom end in the direction of Z axis.

Preferably, the power driving unit obtains the driving voltage or current by means of pulse width modulation or current, in particular, using the received command voltage or command current to control the width of the squarewave pulse or control the intensity of the current to obtain the desired driving voltage or current.

Preferably, the control unit further includes a feedback display unit for the remote controller, this unit transferring the information and state the operator concerns to a receiver fixed to the vehicle, and the receiver transferring them to the remote controller in the form of radio wave; the remote controller is provided with liquid crystal display to show the received feedback information.

Preferably, the remote controller is provided with a proportional rocker for controlling movement of each boom section and the rotary platform; and a proportional rocker for controlling the lifting and lowering movement of the boom end in the direction of the Z axis.

Preferably, the data between the receiver, the control unit and angle measuring unit are transferred through a CAN bus.

Preferably, the remote controller is provided with a coordinate rotating switch for rotating the established coordinate system in the horizontal plan for a certain degree.

In comparison with the prior art, the intelligent boom control device according to the present invention provides a control mode under the rectangular coordinate system. Under the control mode, the operator transmits the movement control command including the X axis component and the Y axis component on the plane parallel to the horizontal plane and the Z axis component in the vertical direction using the remote control, and then the control unit controls the boom to move to the direction indicated by the movement control commands in the rectangular coordinate system based on the current position of the boom end and the movement control command. Since the movement is planned under the rectangular coordinate system, the control of straight line movement can be intuitionally conducted. A straight line track on a horizontal plane can be achieved according to the present invention.

According to the control device provided by the present invention, it is possible for an operator to easily accomplish the straight line control of the movement track of the boom end, and is especially suitable to occasions requiring the movement track of the boom end to be straight line such as concrete pump truck and the like.

DETAILED DESCRIPTION OF THE INVENTION

Hereafter, an embodiment of the intelligent boom control device provided in the invention will be described referring the boom structure of the concrete pump truck shown in FIG. 1. The boom structure of the concrete pump truck has been described in the background art, and will not be described again herein. Because the key problem solved by the present invention is the control of a boom moving in a horizontal plane, the following description will mainly focus on the movement control of the boom in a horizontal plane. Control of the boom lifting and lowering in vertical direction will not be described in detail herein because it is simpler than the movement control in a horizontal plane.

Figure 4:
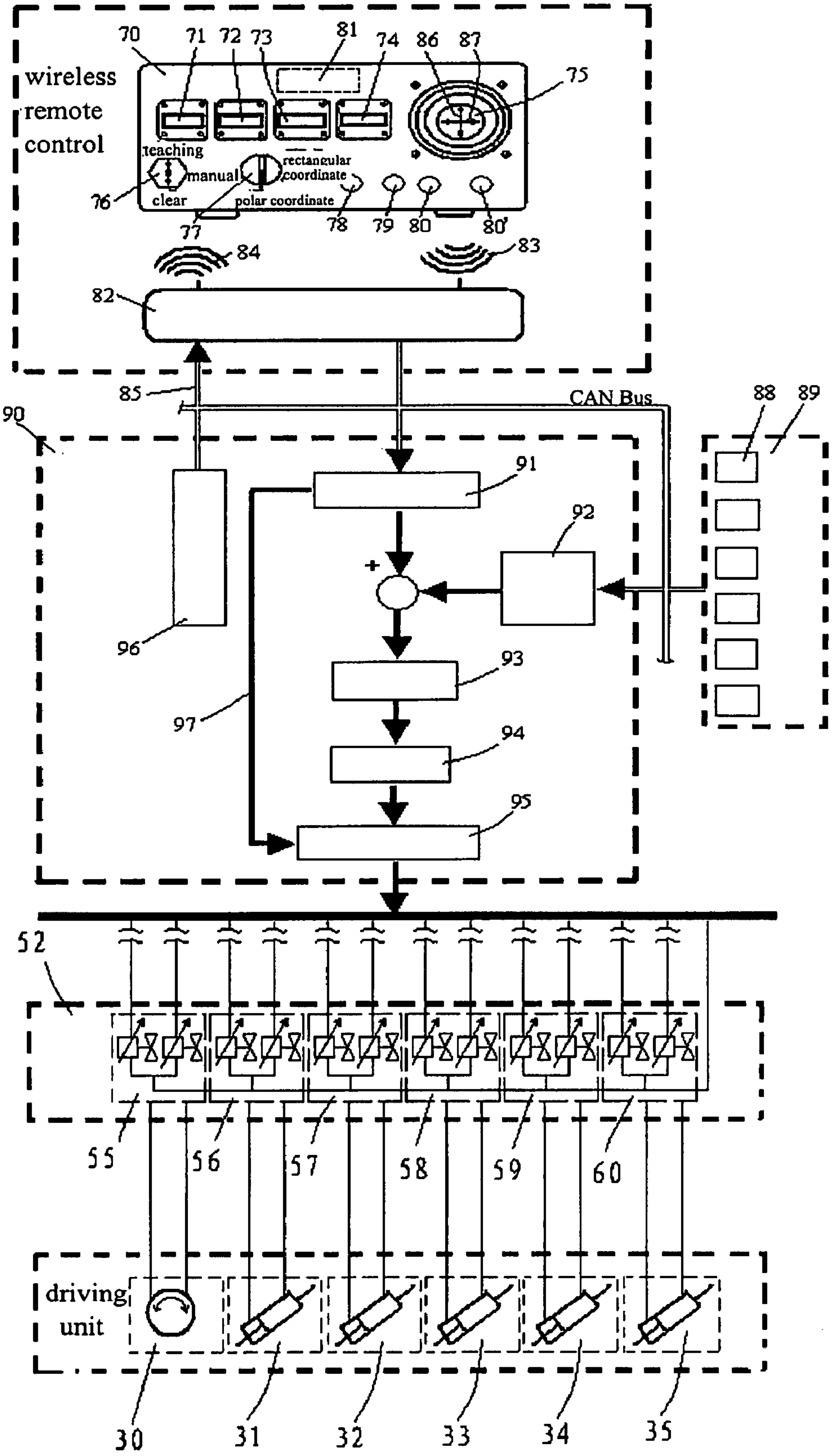
FIG. 4 shows a principle block diagram of a intelligent boom control device according to the first embodiment of the present invention.

FIG. 4 shows a principle block diagram of an intelligent boom control device according to the first embodiment of the present invention.

As shown in FIG. 4, this intelligent boom control device includes a remote controller 70, a receiver 82 fixed to a concrete pump truck, an angle measurement unit 89, and a control unit 90.

The remote controller 70 includes five proportional rockers 71-75, wherein each of the proportional rockers 71-74 has a primary direction which can be adjusted forward or backward, and the proportional rocker 75 has two primary directions in which it can be adjusted by fore-and-aft movement and left-and-right movement, respectively, to transmit control signal. Further, the remote controller 70 has an operating mode selection switch 77, which is designed as a self-lock selection switch with three steps corresponding to different operating modes including manual operating mode, cylinder coordinate mode and rectangular coordinate mode. In addition, this remote controller 70 has a few of other control mechanism. A control signal generated by operating the control mechanism such as the proportional rockers correspondingly generates a wireless remote control signal 83 and then transmits it.

The receiver 82 is fixed to a concrete pump truck for receiving the wireless remote control signal 83 transmitted from the remote controller 70, converting it to control data flow which is then transmitted to control unit 90 via a CAN (Controller Area Network) data bus 85. Since many control signals are to be transferred, CAN bus is adopted for information transmission, which on one hand effectively reduce the signal attenuation due to the length of electrical wire and on the other hand reduce the weight of the electrical wire harness.

The angle measurement unit 89 includes six angle sensors 88 for measuring the angles between the respective boom sections, angle between the first arm and machine frame as well as the rotation angle of the rotary platform deviating from the center position where the boom is rested when retracted, and transferring the above measured values of the angles to the control unit 90.

Figure 2:
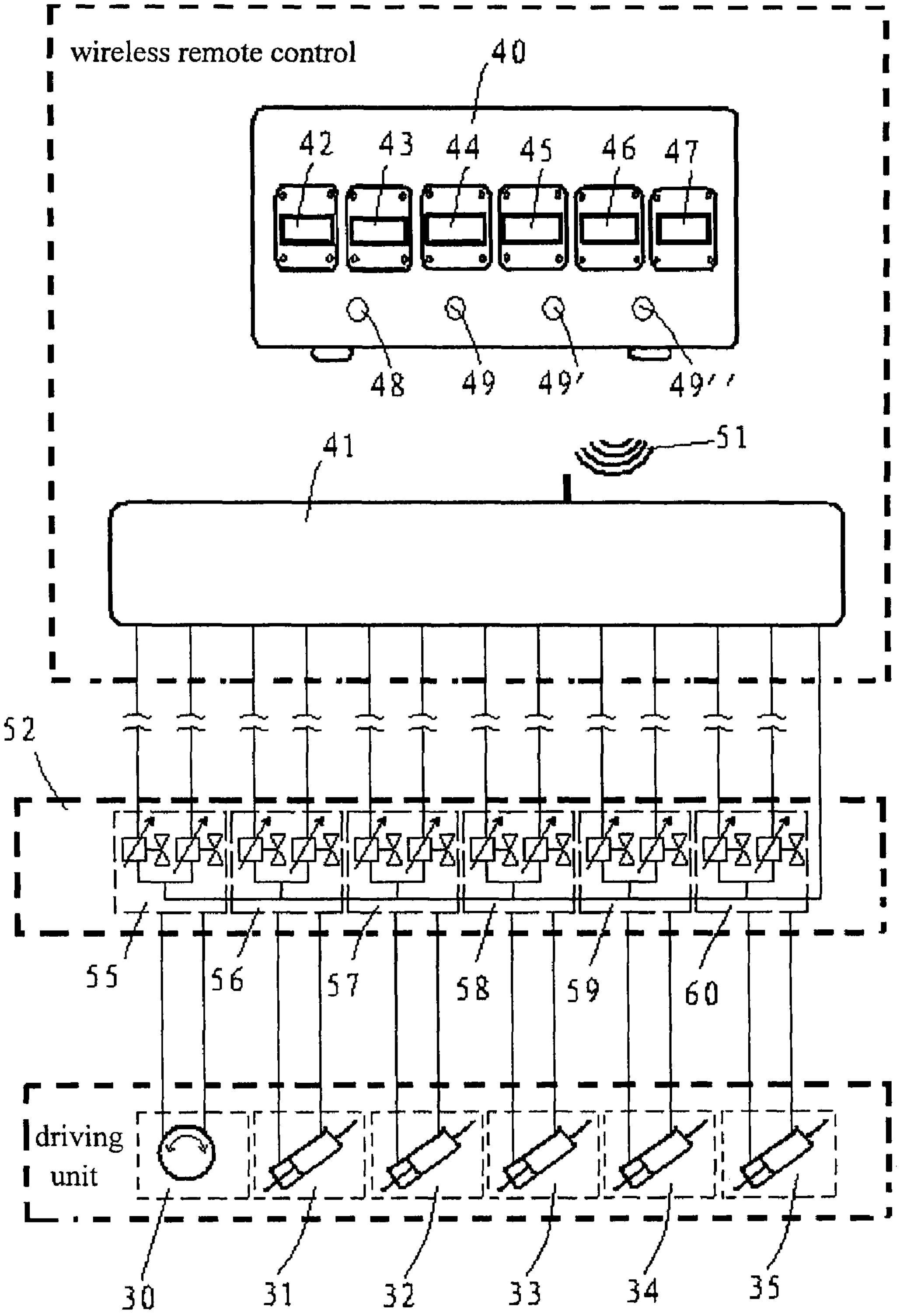
(Prior Art) Fig. 2
FIG. 2 shows a boom control device according to the prior art.

FIG. 4 further shows an electric proportional multi-way valve 52 and an actuating unit 53, function and configuration of which are the same as those illustrated in FIG. 2 and described in the background art. Identical elements are denoted by same reference numeral and will not be described again.

The control unit 90 receives the control data flow transmitted from the receiver 82 and the measured valve of angle transmitted from the angle measurement unit 89 via the CAN data bus 85, then carries out a calculation based on the above data to generate driving voltage for controlling the oil motor and the oil cylinders in the actuating unit 53. This control unit 90 converts the control commands into driving voltage, which is crucial for the boom to move in accordance with expected movement track.

The control unit 90 includes the following subunit: a command parameter decomposing unit 91, an actual position calculating unit 92, a movement planning unit 93, a flow control unit 94 and a PWM (pulse width modulation) voltage output unit 95. Subunits included in the control unit 90 may be embodied either as software modules or hardware modules.

The command parameter decomposing unit 91 receives the control data flow transmitted via bus 85, and decomposes it to recognizable command codes which correspond to positions of the control mechanisms such as the selection switches and the rocker on the remote controller 70. Command codes related to the technical problem solved by the present invention includes operating mode, inclining direction and pushing amount of the rocker of the remote controller, teaching and clear command, as well as other command codes including the lock state of the boom and the rotary platform. In fact the inclining direction and pushing amount of the rocker represent movement control commands such as movement direction and speed of the boom end. Under the polar coordinate or rectangular coordinate mode, the command parameter decomposing unit 91 recognizes the real-time data transmitted from the remote controller 70 and decomposes them into various command codes described above, then transmits the codes to the movement planning unit 93 as input parameters of the movement planning unit 93. In manual operating mode, the operating command for a certain boom section is directly transmitted to the PWM voltage output unit 95.

The actual positions calculating units 92 is used to receive the data of measured value of angles output from the angle measurement unit 89 via the CAN data bus 85, and calculate the actual position information of the boom 9 according to said calculated data. The position information comprises the information regarding strokes of the hydraulic oil cylinders 31-35 and position coordinate of each boom section end including the boom end, which is calculated according to the relationship between sides and angles of an arbitrary quadrangle after movement angle of each boom section is obtained, and the calculating result is transmit to the movement planning unit 93.

The movement planning unit 93 is used to receive the command code outputted from the command parameter decomposing unit 91 and the actual position information of the boom 9 calculated by the actual position calculating unit 92 and comprising the actual position of each boom section end to calculated target position. The coordinates of the target position is obtained by adding a preset steplength 20 in the movement direction indicated by movement control command from the proportional rocker to the current position of the boom end. Based on the target position, the locking state between each boom section of the boom 9 and the rotary platform 11, and the current position of each boom section of the boom 9 and the rotary platform 11, the direction and the amount of movement of each boom section of the boom 9 and the rotary platform 11 required to obtained next desired movement track is calculated. The movement planning unit 93 may need to plan the movement under the following limiting conditions including: the first arm 12 is locked, the first and second arms 12 and 13 are locked, the rotary platform 11 is locked, none of the boom sections of the boom 9 is locked, and the rotary platform is involved in the control in the rectangular coordinate. The result calculated by the movement planning unit 93 is outputted to the flow control unit 94. The movement planning unit 93 functions as determining the movement direction and track of the boom end 20 and decomposing the movement of the boom end 20 into the movement the boom sections 12-16 and the rotary platform 11. The movement direction and track of the boom end 20 is determined according to the movement control command transmitted by the operator via the remote controller 70 and the current operating mode of the control device. The movement planning obtained by the movement planning unit 93 should guarantee desired movement of the boom, for example, movement of the boom end 20 in a plane parallel to the horizontal plane.

The flow control unit 94 is used to receive the movement planning outputted from the movement planning unit and judge the reasonableness of the movement planning. If it is judged that the movement planning is reasonable and feasible, the movement planning will be used as the basis on which the hydraulic oil flow distribution of the actuating mechanisms for each boom section and the rotary platform is controlled, whereby the flow control unit 94 outputs a command voltage or command current for each movement mechanism. Said command voltage or command current determines opening amount and direction of each control valve in the electric proportional multi-way valve 52. Thereby, the direction and mount of the flow of the hydraulic oil distributed into the oil cylinder of each boom section and the oil motor of the rotary platform are further determined. The direction of the flow determines whether the oil cylinder elongate or shorten and whether the oil motor will normally rotate or reversely rotate, while the mount of the flow determines the moving speed of the oil cylinder and the rotary platform. The cooperating between the each boom section and the rotary platform determines the movement track of the boom end. Judging whether the movement planning is reasonable comprises judging whether the sum of the oil supply for each actuating element does not exceed the maximum valve of the total oil supply, to avoid the case where the desired movement cannot be realized. If the oil supply exceeds the maximum valve of the total oil supply, the flow control unit 94 may reduce the oil supply for each actuating element by a same proportion to realize the normal drive. Judging whether the movement planning is reasonable further comprises judging the movement continuity of each boom section and the rotary platform 11 with respect to the current position. The term "continuity" means that there is no break in the movement of each boom section and the rotary platform 11 with respect to the current position, i.e., there is no excessive movement variation between adjacent time periods to avoid uneven movement. If it is judged that the movement satisfies the continuity requirement, the movement planning is reasonable; if it is judged that the movement does not satisfy the continuity requirement, the movement planning is unreasonable. The moving speed of the boom end 20 is kept corresponding to the pushing amount of the proportional rocker by means of the flow control unit 94, i.e., the speed is slow when the pushing amount is small and the speed is fast when the pushing amount is great. Further, the flow control unit 94 may obtain the actual position of the boom based on the measured valve of the actual position of the boom, and thus obtain the actual movement track of the boom end, whereby adjust the command voltage or the command current to implement servo control. Furthermore, the flow control unit 94 may also obtain the moving speed of the boom end 20 based on the position change of the boom per time unit, whereby adjust the command voltage or the command current to implement synchronous control of the boom.

By mean of said movement planning unit 93 and said flow control unit 94, the movement under cylinder coordinate mode and rectangular coordinate mode may be carried out with cooperation of the boom sections and the rotary platform.

The PWM voltage output unit 95 is used to receive the command voltage or command current for each boom section as well as the rotary platform 11 outputted from the flow control unit 94, or directly receive the command parameters outputted from the command parameter decomposing unit 91, and generate PWM driving voltage or current for driving the electric proportional valves 56-60 according to the command so as to drive and control the electric proportional valves 55-60 and thus control the elongating or shortening of the hydraulic oil cylinders 31-35 as well as the rotation of the hydraulic motor 30. The elongating or shortening of the hydraulic oil cylinders 31-35 causes involved boom sections to pivot about joint shafts, and the rotation of the hydraulic motor 30 also causes the whole boom 9 to rotate about the upright axis 18 by means of the reducing mechanism. With the rotation of all boom sections cooperating with the rotation of the whole boom 9, the boom end 20 follows the movement track desired by the operator.

The above-mentioned intelligent boom control device has three control modes, comprising manual control mode, cylinder coordinate control mode and rectangular coordinate control mode. A control mode is chosen among these three control modes by means of steps on an operating mode switch 77.

Under the manual control mode, the command parameter decomposing unit 91 decomposes the signals received from proportional rockers into signals corresponding to components. That is, signals from the proportional rockers 71-74 corresponds to the boom sections 12-15, a first primary adjustment direction 86 (the rocker being inclined forward or backward) of the proportional rocker 75 corresponds to the boom section 16, and a second primary adjustment direction 87 (the rocker being inclined leftward or rightward) of the proportional rocker 75 corresponds to the rotary platform 11. The decomposed control signals is transmitted to the PWM signal output unit 95, which generates PWM driving voltage to drive the electric proportional multi-way valve 52, through a branch 97. The control function of the manual control mode is the same as that of the prior art shown in the FIG. 2. The manual control mode is used in the situation where the linkage operating manner of the boom is not suitable or there is a failure in the system implementing the linkage operating manner. The inclining directions of said proportional rockers respectively correspond to the movement direction of the boom sections or the rotary platform. The pushing amounts of said proportional rockers respectively correspond to the moving speed of the boom section or the rotary platform. The greater the pushing amount, the faster the moving speed.

Figure 1:
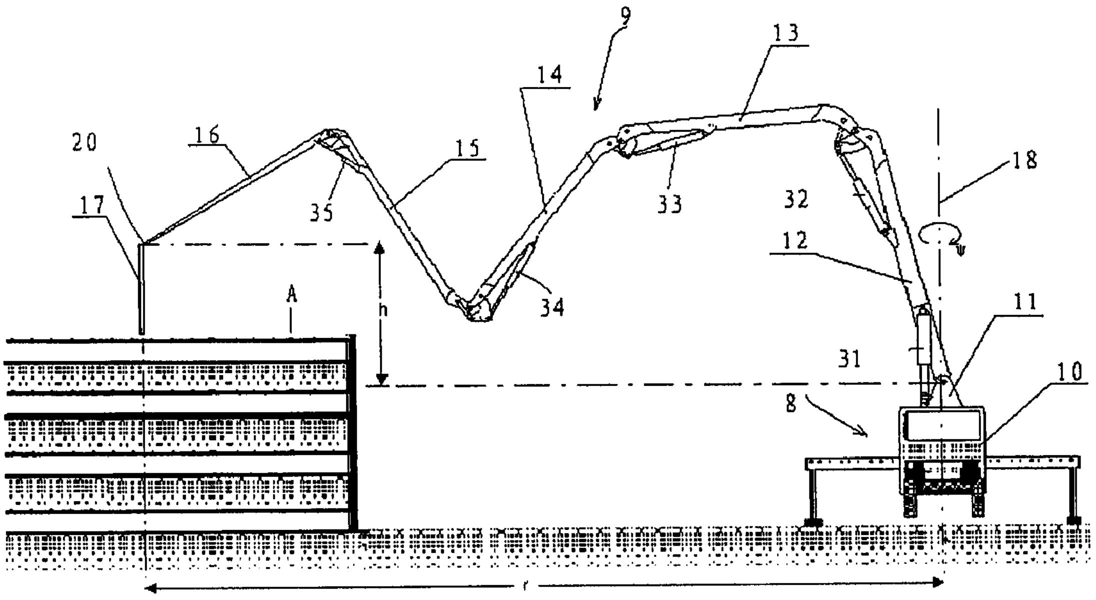
(Prior Art) Fig. 1
FIG. 1 is a diagrammatic illustration showing a boom to be controlled by the present invention.

Said cylinder coordinate control mode is substantially the same as that disclosed in the German Patent Application No. DE-A-4306127 of Putzmeister Company, i.e. the cylinder coordinate system has three components: ψ, r and h (referring to FIG. 1). This embodiment of the invention is different from the Putzmeister's solution in that, based on the arrangement of the operating rocker provided on the remote controller of this embodiment, the adjustment of component r corresponds to the first primary adjustment direction 86 of the rocker 75, i.e., the forward or backward inclination of the rocker 75 corresponds to the increase or decrease of the component r, which is the elongating or shortening movement of the boom, while the height h of the boom end keeps unchanged. At the same time, the adjustment of component ψ corresponds to the second primary adjustment direction 87 of the rocker 75, i.e., the leftward or rightward inclination of the rocker 75 corresponds to the increase or decrease of the component ψ, which is the clockwise or counterclockwise rotation of the rotary platform. As 2-dimensions movement in the horizontal plane of the adjusting action subdivision, the adjustments of these two components are combined in the rocker having two primary adjustment directions. If the inclining angle of the rocker 75 is defined with an angle with respect to said primary adjustment directions, then both the components r and ψ are effective on the movement of the boom end, thereby the boom carries out the combination of the elongating or shortening and the rotation while the height h of the boom end keeps unchanged. The adjustment of the height h of the boom end is controlled by a separate rocker 71 and is independent of the movement of the boom end in the horizontal plane. The forward inclination of the rocker increases the height h, and the backward inclination decrease the height h. The above-mentioned functions are realized by the cooperation of the actual position calculating unit 92, the movement planning unit 93, flow control unit 94, and PWM voltage output unit 95 or the like in the control unit 90.

Figure 3A:
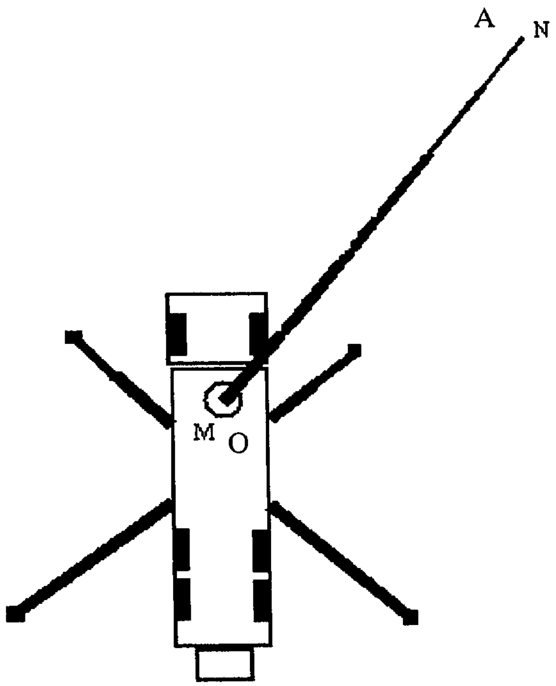
(Prior Art) Fig. 3a
FIG. 3*a* shows a projection of the boom end at initial position.
Figure 3B:
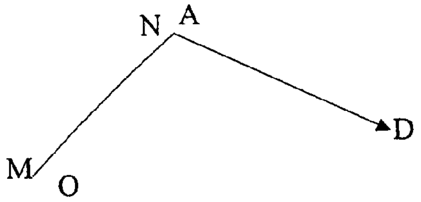
(Prior Art) Fig. 3b
FIG. 3*b* shows the required track of the boom end movement.
Figure 3C:
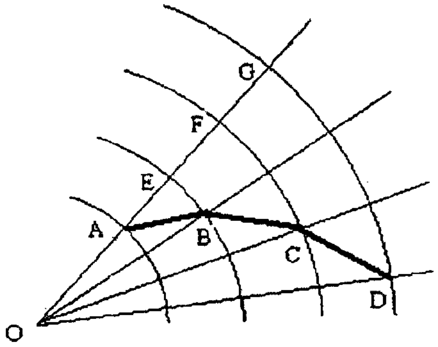
(Prior Art) Fig. 3c
FIG. 3*c* shows a track of the boom end N in cylinder coordinate mode.

Under the cylinder coordinate control mode, the movement planning unit 93 determines whether the boom 9 elongates or shortens simply according to the component of the rocker 75 in forward and backward primary direction, whereby the next movement track of the boom is calculated. FIG. 3*c* shows a specific movement track of the boom end in the cylinder coordinate control mode. As seen from FIG. 3*c*, the finally formed movement track of the boom end is a curve.

Under the cylinder coordinate control mode, the movement planning is relatively simple, because the rotation of the boom only relates to the movement of the rotary platform 11, no corresponding relationship with the coordinate is involved, and no dedicated calculation is needed. The only thing that needs to be done in the movement planning is to decompose the extending or retracting movement in r direction into movement of each boom section. No planning for the rotary platform is needed.

The major disadvantage of the above-mentioned cylinder coordinate control mode has been described above, i.e., under this cylinder coordinate control mode, whilst it is convenient to move the boom end from one point to another in a horizontal plane, the movement track between the two points is a curve. It is impossible to form a straight-line movement from one point to the other point in the same horizontal plane, unless the boom only extending and retracting movement in the r direction without the rotation movement. No straight-line movement can be achieved if rotation is involved.

The rectangular coordinate control mode is a unique operating mode. In respect that the straight-line movement is the dominant movement manner required in placing execution, this embodiment designs a brand new rectangular coordinate control mode for the control device. In this rectangular coordinate control mode, it is possible to accomplish the straight-line movement from one point to another in a same horizontal plane, i.e. the movement track is a straight line. Accordingly, this control mode is particularly suitable for cement placing in the construction.

Figure 5A:
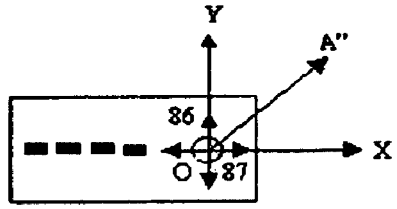
FIG. 5*a* shows a rectangular coordinate system established for the proportional rocker.

This rectangular coordinate control mode introduces orthogonal X-axis and Y-axis, which are different from the cylinder coordinate components r and ψ, as well as a Z-axis, which is same as the h axis of the cylinder coordinate and will be not described in detail. As shown in FIG. 5*a*, the first primary adjustment direction 86 (forward and backward direction) of the proportional rocker 75 is defined as longitudinal axis Y, and the second primary adjustment direction 87 (leftward and right direction) is defined as horizontal axis X. The definitions determine the relationship between the primary adjustment directions of the rocker 75 and the rectangular coordinate system. When the rocker 75 is inclined toward other adjusting direction than the primary adjustment directions, components of the adjustment on the two primary adjustment directions are the movement commands in the X axis and the Y axis, respectively.

It is very easy to determine the X axis and Y axis directions of the rectangular coordinate system on the remote controller 70, because the primary adjustment directions of the rocker 75 are fixed. However, it is very difficult to determine the X axis direction and Y axis direction of the rectangular coordinate system on the horizontal plane in which the boom end moves, because it needs a reference system. As desired, this embodiment provides two manners for determining the rectangular coordinate system in which the boom end moves in the horizontal plane, i.e., centering manner and teaching manner of the proportional rocker 75.

The centering manner of the proportional rocker 75 means that the rectangular coordinate system of the movement horizontal plane of the boom is determined according to the boom position when the proportional rocker 75 is centered. The so-called "center" means that the proportional rocker 75 is placed in a center position in both primary adjustment directions.

As mentioned, the movement of the proportional rocker 75 causes a response in the control device 90. In the case where the rectangular coordinate system is determined in this centering manner, the control device 90 treats the centering of the proportional rocker 75 as a particular event, i.e., regarding the centering of the proportional rocker 75 as a different point between the two control processes before and after it. When the proportional rocker 75 is centered, the previous control process ends and the next process starts, and it is required to establish a new rectangular coordinate system.

Figure 5B:
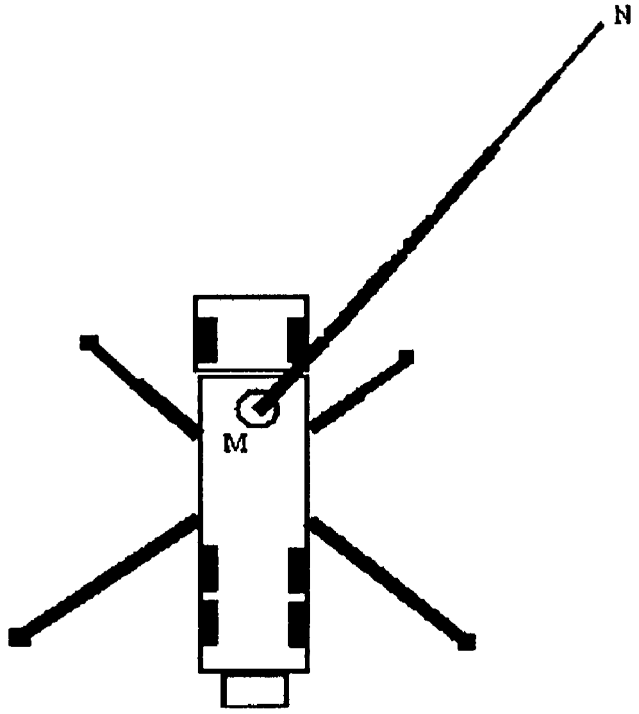
FIG. 5*b* shows the projection of boom the horizontal plane when the proportional rocker centers to the center position.
Figure 5C:
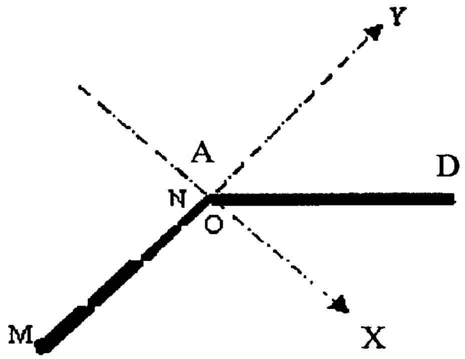
FIG. 5*c* shows a rectangular coordinate system established in the horizontal plane of the boom end at the boom position described above.

The new rectangular coordinate system may be established in the following manner: when the proportional rocker 75 is centered, the rotary platform is used as origin of the coordinates and the direction in which the boom is extended is used as the positive direction of the Y axis. As shown in FIG. 5*b*, when the proportional rocker 75 is centered, the projection of the boom in the horizontal plane is MN. When the rocker 75 leaves the centering position for the next time, the movement coordinate system of the boom, which corresponds to the coordinate system determined on the proportional rocker 75 shown in FIG. 5*a*, is established in the following manner: N is used as origin of the coordinate system, the elongating direction of the boom is used as Y direction, and the X direction is further determined according to the determined Y direction. FIG. 5*c* shows the rectangular coordinate system determined based on the boom position shown in FIG. 5*b*.

After the rectangular coordinate system of the proportional rocker 75 and the rectangular coordinate system of the movement horizontal plane of the boom are determined, the two rectangular coordinate systems are corresponding to each other, i.e., the inclining direction of the proportional rocker 75 in its rectangular coordinate system indicates the direction in which the boom end is to be moved in the rectangular coordinate system of the movement horizontal plane of the boom.

Figure 5D:
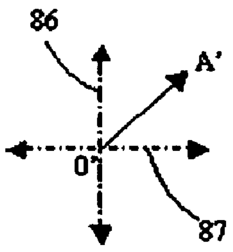
FIG. 5*d* is a diagrammatic illustration of the inclining direction of the proportional rocker.

That the rocker 75 inclines from origin O' of the coordinate to point A' as shown in FIG. 5*d* means that the boom end N is required to move from the point A overlapping with the origin O of the coordinate to the point D and the moving speed of the boom end N is associated with the pushing amount of the proportional rocker 75. The greater the pushing amount of the proportional rocker 75 is, the faster the moving speed of the boom end is. Unlike the cylinder coordinate control mode, under the rectangular coordinate control mode, the movement track moving from the point A to the point D is decomposed into X axis and Y axis of the rectangular coordinate system. That is, the boom end N moves in the direction of the straight line AD and achieves the straight-line movement track, which requires the moving speed of the boom end in X axis to collaborate with the moving speed of the boom end in Y axis to keep the boom end N moving in the direction of AD.

The movement planning unit 93 determines the movement direction of the boom in the rectangular coordinate system based on the inclining direction of the proportional rocker 75. In order to obtain the movement direction, it is necessary to plan the movement to ensure correct movement direction of the boom and obtain a straight-line movement track. Since either the movement of the boom in X axis or the movement of the boom in Y axis is not driven by a single actuating device, the movement planning in the rectangular coordinate system is considerable complex.

Since the movement of the boom end is decomposed into the movement in X axis and the movement in Y axis in the rectangular coordinate system, the movement planning unit 93 has to consider the collaboration between the rotation of the boom and the extension and retraction of the boom so as to ensure that the boom always move in the movement direction given by the commands along a straight line. The movement planning unit 93 plans the movement in the follow manner: firstly, a desired movement direction is calculated based on the valves of the X component and Y component of the movement control command; then, the coordinate position reached after moving at a preset steplength in said movement direction from the current position is calculated, whereby planning the desired movement of each boom section and the rotary platform 11 required for reaching this position. It also needs to keep the height of the boom end 20 unchanged during the movement in the movement planning. Furthermore, in the actual movement, the flow control unit 94 verifies the movement planning in view of the movement continuity, and performs servo control and synchronization control. During the movement, if the remote controller 70 is still transmitting the same movement control command, it is continue to obtain next coordinate position based on the steplength parameter and plan next movement. The steplength parameter is a preset parameter valve, which determines at what step size the movement planning unit 93 will carry out the movement planning.

Figure 5E:
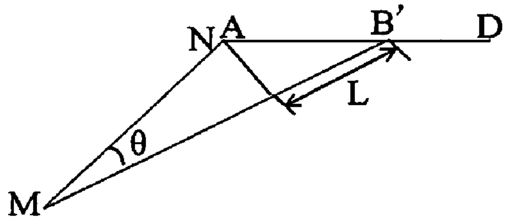
FIG. 5*e* is a diagrammatic illustration of determining movement track when the boom end moves in a straight line in the rectangular coordinate.

As shown in FIG. 5*e*, the steplength is assumed to 1 meter and it is required to move from a point A to a point D. Therefore, it is required to move to a point B' which is 1 meter away from point A. As known from FIG. 5*e*, the boom should rotate clockwise by an angle ∠AMB' (assuming the angle is θ) and the boom should extend a length L (L=MB'−MA). The movement planning outputted from the movement planning unit 93 is to ensure the boom extends a length L while the boom rotates clockwise the angle θ. In order to move from the point A to point D, it is required to continuously provide next point B', whereby the movement planning unit 93 may calculate to obtain a series of movement planning which causes the boom end 20 to move along the straight line AD. With assistance of the servo control and synchronous control of the flow control unit 94, it is possible to ensure the boom end 20 move to point D along a substantially straight-line movement track.

Figure 6:
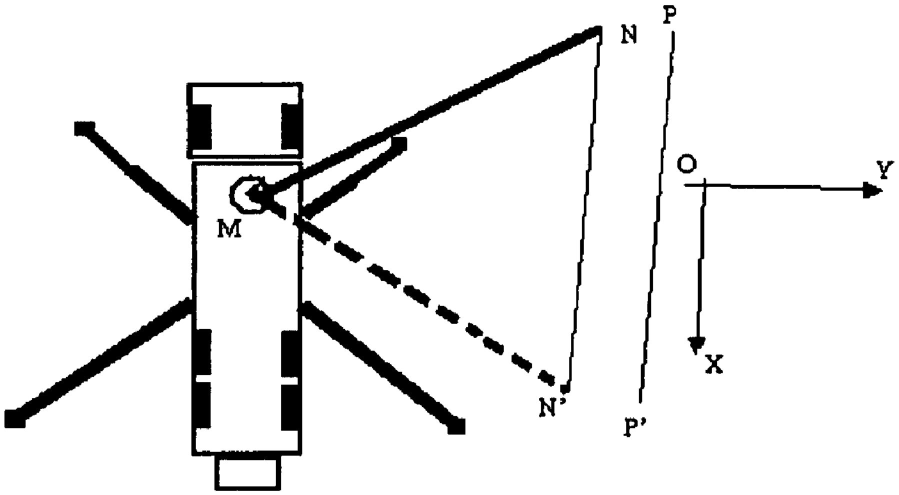
FIG. 6 is a diagrammatic illustration showing the intelligent control device of the boom according to the first embodiment of the present invention establishes a rectangular coordinate system in a teaching manner.

The centering manner for determining the rectangular coordinate system may advantageously satisfies the control requirement of keeping the boom end to move along a straight line. However, there are still some disadvantages in this manner. Therefore, this invention also provides a teaching manner for determining the rectangular coordinate system in a horizontal plane. The teaching manner determines the rectangular coordinate system for the following reason: in actual concrete placing, such as placing a crossbeam or a flat plate, the boom end only need to move in two directions in the horizontal plane, one is the direction parallel to the crossbeam, and the other is the direction perpendicular to the crossbeam and in the horizontal plane. As shown in FIG. 6, it is assumed that the desired movement direction for the boom end is from projection point N to projection point N' in the horizontal plane. The points N and N' are two different points of the crossbeam which is the target of placing. The position of the points N and N' may be recorded by the control unit when the boom end is positioned at the two points to subsequently determine the rectangular coordinate system of the boom movement by a connecting line between the two points. Further, the coordinate system will keep unchanged in this working situation and form a fixed rectangular coordinate system. Once the fixed rectangular coordinate system has been determined, the movement in the second primary adjustment direction 87 of the proportional rocker 75 is a straight-line movement parallel to the straight line NN', for example, PP' shown in FIG. 6. Also, the movement in the first primary adjustment direction 86 of the proportional rocker 75 is a straight-line movement perpendicular to the straight line NN'. Even when the rocker is moved again after centering, it still keep this characteristic, i.e., the coordinate system will not change due to the change of the boom position, unless the coordinate of the two points N and N' is cleared.

in order to achieve this function, the remote controller 70 of this embodiment particularly provides a teaching selecting switch 76, as shown in FIG. 4. Preferably, the teaching selecting switch 76 comprises an auto-reset switch having three positions, which is kept in a center position without external force, is in a forward position defined as "teaching" mode when pushed toward, and is in a backward position defined as "cleaning" mode when pushed backward. When the operating mode select switch 77 is put to the rectangular coordinate mode, the teaching selecting switch 76 is used to send a command to memorize coordinates valve of a certain point and a command to clear coordinates of a certain point. The commands are then transmitted to the control unit 90 via the CAN data bus 85 to be executed by the control unit 90. As shown in FIG. 6, after memorizing the coordinates of the two points N and N', the extending direction of the boom and the direction perpendicular to the direction of the straight line NN' is defined as the positive direction of the Y axis. It is convenient to determine the X axis after the Y axis is determined. The X and Y coordinates in the rectangular coordinate system may be obtain and fixed by the two points memorizing method.

After the rectangular coordinate system is determined by the teaching manner, control method of the control unit 90 in this coordinate system is the same that when the rectangular coordinate system is determined by the centering manner.

In order to achieve the described new function, as shown in FIG. 4, the control unit 90 of this embodiment also comprises a feedback display unit 96 for the remote controller. This unit transmits the information and the state concerned by the operator to a receiver 82 fixed in the automobile via the CAN data bus 85 connected with the control unit 90, and then transmits to the remote controller 70 held in the hand of the operator by a radio wave 84 of certain frequency. Graphics and text may be displayed on the LCD 81 arranged on the remote controller 70. In this way, the operator may obtain the feedback information associated with the current operation in time. This function is an additional function, and is not essential to realize the intelligent control.

Furthermore, in order to easily establish another rectangular coordinate system after one rectangular coordinate system has been established, a special switch (not shown) for rotating the coordinate system may be arranged on the remote controller 70. Once the rectangular coordinate system has been established, it is possible to use the switch to rotate the coordinate system on the horizontal plane by a certain angle. This switch may simplify the establishing process of a new rectangular coordinate system on the basis of an established rectangular coordinate system.

Compared with the prior art, the above-mentioned embodiment is different in that the control device establishes the control mode of rectangular coordinate system. Under this control mode, the control components outputted from the proportional rocker or other control mechanisms are decomposed according to the X, Y and Z axes of the rectangular coordinate system so as to obtain the desired information about the movement direction and carry out the movement planning and control based on the information, whereby obtaining a straight-line movement track in the desired direction. Because of the arrangement of the rectangular coordinate system, it is convenient to control the boom end 20 to move in a straight-line movement track, thereby the construction requirements for placing concrete or the like can be adequately satisfied. Some technical features of this invention may be realized by other manners according to the prior art. For example, the remote controller 70 may transmit the control command in wire control manner; the function of the proportional rocker 75 may be realized by directly inputting numbers indicating the movement direction and speed; and the electric proportional multi-way valve 52 may be proportional servo valve, servo proportional valve or other electric-controlled hydraulic valve, which may be more convenient to be implemented.

The above-described embodiments of the invention are intended to be examples of the present invention and alterations and modifications may be effected thereto, by those skilled in the art, without departing from the scope of the invention which is defined solely by the claims appended hereto.

What is claimed is:

1. An intelligent boom control device, the boom being hinged to a rotary platform rotatable around an upright axis fixed to a machine frame, and the boom having at least three boom sections hinged with each other by horizontal joint shafts, each boom section can pivot restrictedly about the joint shafts parallel to each other with respect to the rotary platform or other boom sections under the action of actuators; said intelligent boom control device comprising:

a control unit for controlling the respective actuators according to control commands so that the boom end moves in the defined coordinate system in accordance with the control commands;

an angle measurement unit including angle sensors for measuring the angles between the boom sections as well as the rotating angle of the rotary platform, said unit being used to provide measured value of angles to the control unit which calculates the boom position information based on the measured value of angles, whereby adjusting the control of the respective actuators; and a remote controller for transmitting the control commands in the form of wireless remote control;

wherein the remote controller can provide movement control commands used in a rectangular coordinate system, the movement command including a X axis component, a Y axis component and a Z axis component;

a rectangular coordinate system is defined in a space, X axis, Y axis and Z axis of this rectangular coordinate system correspond to the X axis component, the Y axis component and the Z axis component of the movement control commands of the remote controller, respectively; wherein a plane defined by the plane rectangular coordinate system consisted of X axis and Y axis is parallel to the horizontal plane; the Z axis always regards the up direction vertical to the horizontal plane as the positive direction;

when the remote controller transmits a movement control command, the control unit determines the movement direction of the boom end in the plane rectangular coordinate system based on the X axis component and Y axis component of the received movement control command, and decomposes the movement into movement of each boom section and the rotary platform so that the boom end moves in the direction indicated by the movement control command in the rectangular coordinate system.

2. A device according to claim 1, wherein the remote controller adopts a proportional rocker having two primary adjustment directions to provide the movement control command, wherein one primary adjustment direction corresponds to X axis, the other primary adjustment direction corresponds to Y axis; when the proportional rocker inclines in a direction other than the primary adjustment directions, the movement control command is generated on the basis of the X axis component obtained by projecting the movement of the proportional rocker on the primary adjustment direction of X axis and the Y axis component obtained by projecting the movement of the proportional rocker on the corresponding primary adjustment direction of Y axis.

3. A device according to claim 2, wherein when a command of establishing a rectangular coordinate system is transmitted, the rectangular coordinate system defined by the X axis and the Y axis is determined using the rotary platform as the coordinate origin and the elongating direction of the boom as positive direction of the Y axis of the rectangular coordinate system.

4. A device according to claim 3, wherein the command of establishing rectangular coordinate system is transmitted when the proportional rocker of the remote controller returns to a center position.

5. A device according to claim 2, wherein the rectangular coordinate system is established in the following manner: recording the initial point position of the boom end in the horizontal plane, then recording the end point position in the horizontal plane to which the boom end finally reaches after moving the boom end, the direction of the connecting line from the initial point to the end point is served as the positive direction of the X axis, whereby establishing the rectangular coordinate system, after establishing the coordinate system, a movement of the proportional rocker of the remote controller in the primary adjustment direction corresponding to the X axis corresponds to a boom end movement parallel to the X axis of the plane rectangular coordinate system, a movement of the proportional rocker of the remote controller in the primary adjustment direction corresponding to the Y axis corresponds to a boom end movement parallel to the Y axis of the plane rectangular coordinate system.

6. A device according to claim 5, wherein the remote controller has a teaching selecting switch, when a teaching manner is selected by the teaching selecting switch, it is started to record the position of the horizontal plane in which the boom end is located so as to determine the rectangular coordinate system.

7. A device according to claim 1, wherein a receiver is fixed to the vehicle on which the boom is mounted, the receiver being used to receive the remote control command transmitted from the remote controller, and convert the received remote control command into an output of control data flow.

8. A device according to claims 7, wherein the actuator is hydraulic oil cylinder and oil motor controlled by electric proportional valve.

9. A device according to claim 8, wherein the control unit includes:

a command parameter decomposing unit for receiving the control data flow outputted from the receiver and decomposing the control data flow into command code corresponding to the control command transmitted from the control mechanism on the remote controller;

an actual position calculating unit for receiving the data of measured value of angles outputted from the angle measuring unit, calculating to obtain the boom position information based on said data;

a movement planning unit for receiving the command code outputted from the command parameter decomposing unit and the boom position information outputted from the actual position calculating unit so as to calculate a movement amount of each boom section and the rotary platform required to move the boom end to a target position and keep it in a given straight line or plane, said movement amount being served as movement planning;

a flow control unit for receiving the movement planning outputted from the movement planning unit and outputting a command voltage or command current controlling each boom section and the rotary platform based on the outputted movement planning;

a power driving unit for receiving the command voltage or command current corresponding to each boom section and the rotary platform which is outputted from the flow control unit, and generating a driving voltage with a corresponding value based on the command voltage or command current so as to control the opening amount and direction of the electric proportional valve and further control elongating or shortening of the hydraulic oil cylinder as well as the rotation of the hydraulic motor to the position determined by the movement planning.

10. A device according to claim 9, wherein the boom position information calculated by the actual position calculating unit includes the position coordinate of each boom section ends and the boom end.

11. A device according to claim 9, wherein when the movement planning unit plans movement, the target position is firstly obtained in the following manner: calculating to obtain the movement direction of the boom end according to the X axis component and the Y axis component of the movement control command in the received command code; based on the movement direction and combined with a preset steplength parameter, the target position of the boom end is obtained by adding the steplength in said movement direction to the current position of the boom end.

12. A device according to claim 9, wherein the flow control unit adjusts the output of the command voltage or command current corresponding to each boom section and the rotary platform based on real-time boom position information on occasion to ensure the boom end moves in a horizontal plane.

13. A device according to claim 9, wherein the incline angle of the proportional rocker on the remote controller corresponds to the moving speed; the flow control unit adjusts the output of the command voltage or command current according to the moving speed.

14. A device according to claim 13, wherein the flow control unit calculates the difference between the boom end moving speed and the command moving speed according to real-time boom position information, whereby adjusts the output of the command voltage or command current corresponding to each boom section and the rotary platform to implement a synchronous control of the boom movement.

15. A device according to claim 9, wherein, after receiving the movement planning, the flow control unit firstly judges the reasonableness of the movement planning, if the movement planning is reasonable, then generate the command voltage or command current; if the movement planning is unreasonable, then require the movement planning unit to replan the movement.

16. A device according to claim 15, wherein the flow control unit judging the reasonableness of the movement planning includes judging the movement continuity of each boom section and the rotary platform with respect to the current position; if the movement is continuous, the movement planning is reasonable; if the movement is incontinuous, the movement planning is unreasonable.

17. A device according to claim 9, wherein the remote controller includes a control mode switch for choosing a control mode which can be rectangular coordinate control mode, cylinder coordinate control mode or manual control mode.

18. A device according to claim 9, wherein the remote controller is further provided with a proportional rocker for controlling the lifting and lowering of the boom end, so as to control the lifting and lowering movement of the boom end in the direction of Z axis.

19. A device according to claim 9, wherein the power driving unit obtains the driving voltage or current by means of impulse width modulation or current, in particular, using the received command voltage or command current to control the width of the squarewave impulse or control the intensity of the current to obtain the desired driving voltage or current.

20. A device according to claim 9, wherein the control unit further includes a feedback display unit for the remote controller, this unit transferring the information and state the operator concerns to a receiver fixed to the vehicle, and the receiver transferring them to the remote controller in the form of radio wave; the remote controller is provided with liquid crystal display to show the received feedback information.

21. A device according to claim 9, wherein the remote controller is provided with a proportional rocker for controlling movement of each boom section and the rotary platform; and a proportional rocker for controlling the lifting and lowering movement of the boom end in the direction of the Z axis.

22. A device according to claim 1, wherein the data between the receiver, the control unit and angle measuring unit are transferred through a CAN bus.

23. A device according to claim 1, wherein the remote controller is provided with a coordinate rotating switch for rotating the established coordinate system in the horizontal plan for a desired angle.

* * * * *